United States Patent
Tripathi et al.

(10) Patent No.: US 11,631,260 B1
(45) Date of Patent: *Apr. 18, 2023

(54) GENERATION OF SYNTHETIC IMAGE DATA USING THREE-DIMENSIONAL MODELS

(71) Applicant: Amazon Technologies, Inc., Seattle, WA (US)

(72) Inventors: Shashank Tripathi, Sunnyvale, CA (US); Visesh Chari, Santa Clara, CA (US); Ambrish Tyagi, Sunnyvale, CA (US); Amit Kumar Agrawal, Santa Clara, CA (US); James Rehg, Atlanta, GA (US); Siddhartha Chandra, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 191 days.

This patent is subject to a terminal disclaimer.

(21) Appl. No.: 17/132,738

(22) Filed: Dec. 23, 2020

Related U.S. Application Data

(63) Continuation of application No. 16/450,499, filed on Jun. 24, 2019, now Pat. No. 10,909,349.

(51) Int. Cl.
*G06K 9/00* (2022.01)
*G06V 20/64* (2022.01)
(Continued)

(52) U.S. Cl.
CPC .............. *G06V 20/64* (2022.01); *G06F 17/15* (2013.01); *G06K 9/6267* (2013.01); *G06N 3/084* (2013.01);
(Continued)

(58) Field of Classification Search
CPC ........ G06V 20/64; G06V 10/25; G06N 20/00; G06N 3/084; G06F 17/15; G06K 9/6267; G06T 17/20
(Continued)

(56) References Cited

U.S. PATENT DOCUMENTS

| 10,297,070 B1 | 5/2019 | Zhu et al. |
| 10,482,600 B2 | 11/2019 | Zhou et al. |
| 10,719,742 B2 | 7/2020 | Shechtman et al. |

OTHER PUBLICATIONS

Wang, Xiaolong, Abhinav Shrivastava, and Abhinav Gupta. "A-fast-rcnn: Hard positive generation via adversary for object detection." Proceedings of the IEEE conference on computer vision and pattern recognition. 2017. (Year: 2017).*

(Continued)

*Primary Examiner* — Jonathan S Lee
(74) *Attorney, Agent, or Firm* — K&L Gates LLP

(57) ABSTRACT

Techniques are generally described for object detection in image data. First image data comprising a three-dimensional model representing an object may be received. First background image data comprising a first plurality of pixel values may be received. A first feature vector representing the three-dimensional model may be generated. A second feature vector representing the first plurality of pixel values of the first background image data may be generated. A first machine learning model may generate a transformed representation of the three-dimensional model using the first feature vector. First foreground image data comprising a two-dimensional representation of the transformed representation of the three-dimensional model may be generated. A frame of composite image data may be generated by combining the first foreground image data with the first background image data.

20 Claims, 7 Drawing Sheets

(51) Int. Cl.
*G06N 3/084* (2023.01)
*G06K 9/62* (2022.01)
*G06T 17/20* (2006.01)
*G06N 20/00* (2019.01)
*G06F 17/15* (2006.01)
*G06V 10/25* (2022.01)

(52) U.S. Cl.
CPC ............. *G06N 20/00* (2019.01); *G06T 17/20* (2013.01); *G06V 10/25* (2022.01)

(58) Field of Classification Search
USPC ........................................................ 382/103
See application file for complete search history.

(56) References Cited

OTHER PUBLICATIONS

Massa et al.; Deep Exemplar 2D-3D Detection by Adapting from Real to Rendered Views; Proceedings of the IEEE Conference on Computer Vision and Pattern Recognition; 2016; 10 pgs.

Lin et al.; ST-GAN: Spatial Transformer Generative Adversarial Networks for Image Compositing; Proceedings of the IEEE Conference on Computer Vision and Pattern Recognition; 2018; 10 pgs.

\* cited by examiner

GENERATION OF SYNTHETIC IMAGE DATA USING THREE-DIMENSIONAL MODELS

CROSS-REFERENCE TO RELATED APPLICATIONS

This application is a continuation of and claims priority to U.S. patent application Ser. No. 16/450,499, filed Jun. 24, 2019, now U.S. Pat. No. 10,909,349, the disclosure of which is incorporated herein by reference in its entirety.

BACKGROUND

Machine learning is a field of artificial intelligence that allows computer-implemented systems to perform a task without the use of task-specific code. Machine learning systems may be trained to progressively improve performance of a task using sets of training data. In computer vision, machine learning models are used to detect objects, such as people, cars, animals, and other objects of interest from input image data. In supervised machine learning, annotated data (e.g., data with a labeled input and desired output) can be used to "train" a machine learning model. During training, parameters (e.g., weights and/or biases) of the machine learning model are adjusted so that the output of the machine learning model for a given input matches the desired output from the annotated data. Thereafter, during inference, the trained machine learning model can make predictions when provided with unannotated input data. Accuracy and/or predictive value of machine learning models are often a function of the quantity and quality of annotated data used to train the machine learning model.

DETAILED DESCRIPTION

Figure 1:
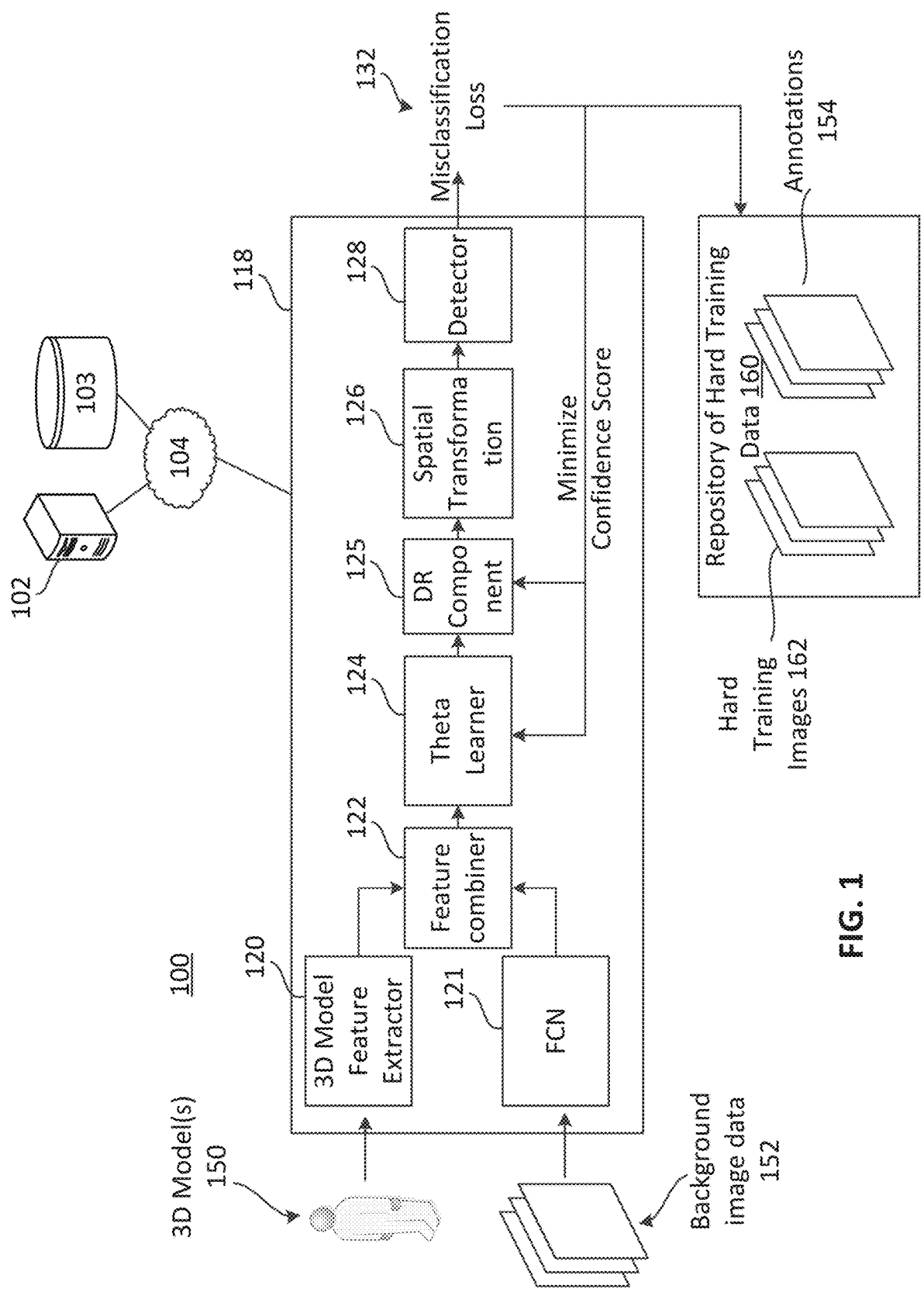
FIG. 1 is a block diagram showing an example system effective to generate synthetic image data using three-dimensional models, arranged in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In various examples, deep learning techniques may be used to detect objects in image data (e.g., pixel representations of objects). Convolutional neural networks (CNNs), single shot detectors (SSDs), region-convolutional neural networks (R-CNNs), Faster R-CNN, Region-based Fully Convolutional Networks (R-FCNs) and other machine learning models may be trained to perform object detection and classification. Object detectors may be trained to detect particular classes of objects (e.g., object classes), such as humans, dogs, furniture, cars, etc. Training an SSD, CNN, and/or other machine learning model, may typically employ annotated training data. Annotated training data comprises labeled image data including data representing bounding boxes that identify the location of objects represented in the image data along with classification data identifying a class of the object (e.g., data representing "cat", "dog", "human", etc.). Image data (e.g., frames of image data) and/or feature vectors extracted from image data may be annotated or unannotated. Object detection by machine learning models may be heavily dependent on annotated training data. Generally, although feature vectors may be referred to herein, the various techniques described below may instead use (or additionally use) feature maps. Accordingly, as used herein, feature data may refer to either feature vectors, feature maps, or some combination thereof.

Training data for training computer vision object detection models may be expensive and time-consuming to generate. In various examples, images may be manually annotated by humans. However, such a process is slow and cumbersome and only allows for existing images to be converted into labeled image data without providing new images. In some other examples, synthetic training data may be generated. Some techniques include using virtual image data, such as computer-generated images from video games, to generate frames of annotated image data. In such examples, annotation is already provided as location information of objects and object labels are provided in the code for the video games. In various other example techniques, objects of interest may be cut from existing image data and composited with other images. Such techniques multiply the number of data points in a training data set. For example, a single annotated training image may include ten people and ten bounding boxes (one around each person). Such an annotated image provides a single data point for a training data set that can be used to train a human detector machine learning model. However, if a single image of a person is cut from an image and composited at known locations in ten different images, ten data points are created that can be used to train the human detector machine learning model. Accordingly, generation of synthetic training data may greatly increase the amount of annotated data available for training object detectors.

In various examples described herein, three-dimensional (3D) models may be used to generate synthetic composite image data. For example, a 3D model of an object-of-interest may be articulated and/or positioned in a variety of ways. Two-dimensional (2D) representations of the 3D model may be generated and the 2D representation may be composited with a background image in order to generate synthetic annotated training data. Objects-of-interest may include any objects for which a machine learning detector model is being trained to detect. Some examples may include humans, furniture, buildings, cars, roads, dogs, cats, surfaces, patterns, etc. In various examples, 3D models may include one or more movable parts (e.g., articulable joints in a 3D model of a human, opening car doors in a 3D model of a car, etc.). Additionally, 3D models may include one or more light sources that may be defined spatially (e.g., by a 3D coordinate of a point light source) and/or in terms of intensity and/or color (wavelength). The location of the light source(s) and the particular position and/or pose of the 3D model may affect the appearance of the 3D model (as well as the 2D representation thereof). Additionally, 3D models may be composed with various skins, textures, clothes, and/or other features. For example, if the 3D model is a representation of a human, the clothes of the human may be selected and changed. Additionally, body shape of the 3D model may be changed. As described in further detail below, a theta learner component may learn transformations that may be applied to the 3D model in order to alter the appearance of the 3D model (e.g., by changing the size, shape, position, rotation, shape, appearance, lighting, articulation of one or more components, etc.).

In various examples described herein, a data representation of the 3D model (e.g., a "raw" data representation) may be sent to a 3D model feature extractor. The 3D model feature extractor may be trained to extract feature vectors describing the 3D model (e.g., describing both the characteristics of the 3D model and ways in which the 3D model can be altered, such as by articulating various portions of the 3D model, changing the light source, etc.). In various examples, the 3D model feature extractor may be a fully convolutional network (FCN). In at least some examples, the 3D model feature extractor may comprise a graph convolutional neural network (GCN). Graph convolutional neural networks may be configured to receive a mesh representation of the 3D model as a raw data input (e.g., a polygon mesh comprising vertices and surfaces) and may perform a convolution operation over the surface of the 3D model mesh to generate feature vectors representing the 3D model. Graph convolutional neural networks may differ from conventional convolutional neural networks in that conventional convolutional neural networks use a kernel to perform a convolution operations over a 2D grid (e.g., a grid of pixels). Conversely, graph convolutional neural networks perform convolutions over a surface by taking a general version of connected inputs and determining nodes connected to the inputs based on neighborhood constraints. Graph convolutional neural networks generalize simulations to work over a surface that is not in a grid format by generalizing the convolution operation to work on any set of connected nodes and edges. Additionally, graph convolutional neural networks employ dynamic receptive fields and may perform convolution operations on both the surface of a mesh and textures of the mesh. As used herein, textures of a mesh refers to color values of vertices of the mesh which may be convolved using a graph convolutional neural network.

In some other examples, a parametric representation of the 3D model may be provided as raw input data. Parametric representations of 3D models may also represent texture of the 3D model (e.g., color values of vertices of the 3D model) to represent color information of the 3D model. In examples where parametric representations of the 3D model are provided as raw input data, the 3D model feature extractor may comprise an encoder trained as part of an encoder/decoder network. The encoder may take the parametric representation of the 3D model as input and may generate feature vectors representing the 3D model and ways in which the 3D model can be altered, as described above. The decoder may take the feature vectors representing the 3D model as input and may generate a parametric representation of the 3D model. The cost/loss may be determined by comparing the parametric representation output by the decoder to the "raw input" parametric representation. Back propagation may be used to train the encoder/decoder network based on the cost/loss. After training the encoder/decoder network, the encoder may be used to generate feature vectors representing the 3D model from the parametric representation of the 3D model.

Similarly, feature data describing background image data (e.g., data to be composited with a two-dimensional representation of the 3D model) may be extracted. The background image data may be input in the form of two-dimensional image data (e.g., frames of background image data depicting various settings). In other examples, the background image data may also be a 3D model. In examples where the background image data is a 3D model, a GCN and/or encoder/decoder network may be used to determine feature data representing the 3D background model (depending on the particular implementation and/or on the raw data type of the 3D background model (e.g., mesh, parametric representation, etc.).

Conversely, if the background image data is a two-dimensional (2D) frame of image data, the 2D frame of background image data may be input to one or more fully convolutional networks (FCNs) that may extract feature vectors describing one or more visual components of the background image data.

After extracting feature vectors representing the 3D model and feature vectors representing the background (whether 2D or 3D), the feature vectors may be concatenated and/or otherwise combined. In some other examples, matrix multiplication may be used to combine feature vectors representing the 3D model and the background image data. In addition the level at which the feature vectors are extracted and/or combined may be determined by the systems described herein. For example, higher or lower level feature vectors may be used depending on the particular implementation. In at least some examples, the system may learn the appropriate layer of the machine learning models from which the feature vectors are to be extracted for a particular implementation. The combined feature vectors (e.g., concatenated feature vectors) may be provided to a deep learning network, such as a CNN, that may be effective to determine, based on the combined feature vectors, operations to be performed on the 3D model in order to generate a composite of a 2D representation of the 3D model (e.g., "foreground image data") and the background image data. The deep learning network is referred to herein as a "theta learner". The operations may include rotations, translations, articulations of movable parts of the 3D model, changes in shape, size, dimensions, colors, textures, skins of the 3D model, changes in numbers, positions, temperatures, and/or intensities of light sources, camera parameters (focal length, field-of-view, aspect ratios for capturing combo of 3D foreground and 3D background), etc.

After determining the various operations to be performed on the 3D model, a differentiable renderer component (e.g., a neural mesh renderer (NMR)) may be used to determine a 2D representation of the 3D model, as transformed according to the operations determined by the theta learner. The differentiable rendering component may be referred to herein as a DR component. As described in further detail below, the DR component may be part of the overall neural network architecture such that back propagation may be used to update parameters of the DR component. For brevity, the 2D representation of the 3D model generated by the DR component (as transformed by the theta learner) may be referred to herein as "foreground image data." This terminology may be used even in the case where the 2D representation of the 3D model is combined with the background image data as part of a composite image. As described in further detail below, parameters of the DR component may be updated using back propagation based on misclassification loss of detector 128.

After determining the foreground image data (as transformed by the theta learner), a spatial transformation layer may combine the transformed 2D representation of the 3D model (e.g., the foreground image data) with the background image data to generate a frame of synthetic composite image data (sometimes referred to herein as a frame of composite image data). The spatial transformation layer may perform the operations determined by the theta learner on the foreground image data in order to combine the foreground image data with the background image data. The spatial transformation layer may generate the synthetic composite image data by compositing the background image data and the foreground image data (as transformed according to the operations determined by the theta learner and as represented in two dimensions by the DR component) on a pixel-by-pixel basis. For example, the spatial transformation layer may determine, for each pixel address of the background image data whether or not a pixel value of the foreground image data should replace the pixel value of the background image data according to operations determined by the theta learner and the DR component. Additionally, in various examples, the spatial transformation layer may determine whether or not pixels of the foreground image data composited with the background image data should be blended with one or more surrounding pixel values of the background image data. As used herein, the term compositing refers to putting one image inside another image. For example, a set of pixels representing a human may be composited in a background image, by replacing pixel values of the background image with pixel values representing the human.

Optionally, prior to compositing the foreground image data with the background image data, a neural network (e.g., a small neural network, such as a neural network having 3-4 layers) may determine operations to be performed on the foreground image data (e.g., the 2D representation of the 3D model) to make the foreground image data look as natural as possible. For example, color values and/or intensity values of individual pixels of the foreground image data may be adjusted in order to make the composite image data appear more realistic (e.g., to a discriminator network).

In various examples, the foreground image data (e.g., the 2D representation of the 3D model generated by the DR component as transformed by the theta learner) may be sent to a natural image classifier. Additionally, the synthetic composite image data representing the combination of the foreground image data and the background image data may be provided to the natural image classifier. The natural image classifier may be a classifier trained to determine whether or not an input image is real (e.g., natural image data captured by an image sensor) or synthetic (e.g., synthetic composite image data generated using the previous machine learning layers described above). In various examples, the determination made by the natural image classifier may be a natural image score indicating a confidence that the input image data is real. In other implementations the natural image score may indicate a confidence that the input image data is synthetic.

Back propagation may be used to provide feedback data from the natural image classifier to the theta learner, the DR component, and/or the optional neural network indicating the natural image score. The theta learner, the DR component, and/or the optional neural network may update parameters (e.g., biases and/or weights) to maximize the likelihood that the natural image classifier will determine that images are real. For example, if a higher natural image score (e.g., a score closer to 1) indicates that the natural image classifier has determined that an image is real and a lower natural image score (e.g., a score closer to 0) indicates that the natural image classifier has determined that an image is synthetic, the theta learner, DR component, and/or optional neural network may be trained using back propagation from the natural image classifier to maximize the natural image score. Additionally, the natural image classifier may be trained using ground truth label (e.g., labels indicating whether training image data is real or synthetic).

In addition to providing the synthetic composite image data to the natural image classifier, the synthetic composite image data may be provided to an object detector. The object detector may be, for example, a single shot detector (SSD) or any computer vision object detection model. The detector may attempt to detect objects-of-interest (e.g., objects that the detector has been trained to detect) in the synthetic composite image data. For example, if the detector has been trained to detect humans, the detector may generate a bounding box surrounding pixels that the detector has identified as corresponding to a human. The detector may generate a confidence score indicating a confidence that the bounding box corresponds to a human. The confidence score may be back propagated to the theta learner and/or the DR component as feedback data. A training objective of the theta learner and/or DR component may be to minimize the confidence scores of the detector. Accordingly, parameters (e.g., weights and/or biases) of the theta learner may be updated to minimize confidence scores generated by the detector. Accordingly, the theta learner and/or DR component may be retrained based on back propagation signals from the detector. Parameters control activations in neurons (or nodes) within layers of the machine learning models. For example, the weighted sum of activations of each neuron in a preceding layer may be input to an activation function (e.g., a sigmoid function, the rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm to incrementally adjust the weights to cause the most rapid decrease (or increase) to the output of the loss function.

In some examples, the detector may be unable to detect objects-of-interest within the synthetic composite image data. This may be the case even where the foreground image data used to generate the synthetic composite image data represents one or more objects-of-interest (in other words, this may be the case even where the 3D model composited into the background represents an objects-of-interest for which the detector has been trained to detect). Synthetic composite image data in which the detector is unable to detect an object-of-interest (despite its presence in the composite image) may be referred to as a "hard positive". Hard positives may be stored in a non-transitory computer-readable memory. The training goal of the theta learner may be to determine operations to perform on the 3D model that minimize the confidence score of the detector. As such, as the parameters of the theta learner are updated during various training iterations to minimize the confidence score of the detector, the theta learner causes more and more hard positives to be generated. Similarly, the training goal of the differentiable renderer component is to generate two-dimensional representations of the 3D model (as transformed by the theta learner) that minimize the confidence score of the detector. As such, as the parameters of the DR component are updated during various training iterations to minimize the confidence score of the detector, more and more hard positives are generated. Once a sufficient number (e.g., a threshold number) of hard positives have been generated, the detector may be retrained, by mixing the hard positive image data with other training data (e.g., with real/natural annotated images). Hard positive image data may be especially beneficial for training the detector, as the hard positive image data represents "blind spots" of the training data distribution used to train the current iteration of the detector. As such, training the detector using hard positives mixed with nominal training data may allow the detector to improve its performance during inference relative to detectors trained using currently available sets of annotated image data, alone.

As described herein, "synthetic" or "fake" composite image data may refer to image data generated by combining two-dimensional representations of 3D model image data with background image data. The terms "synthetic" and "fake" may be used interchangeably in this context. Conversely, "real" image data refers to the actual images captured by a camera or other sensing device. Annotated image data that has been provided for training (e.g., real image data captured by a camera and labeled with one or more bounding boxes identifying the location and/or classification of an object-of-interest) may be referred to herein as "real" annotated image data.

FIG. 1 is a block diagram showing an example system 100 effective to generate synthetic image data using 3D models, arranged in accordance with various aspects of the present disclosure. In various examples, system 100 may comprise a synthetic composite image data training network 118 that may be implemented by computing device(s) 102. In some examples, synthetic composite image data training network 118 may comprise 3D model feature extractor 120 and fully convolutional network (FCN) 121. In various examples, the 3D model feature extractor 120 may be an FCN.

3D model feature extractor 120 may be a deep learning network trained to extract feature vectors describing a 3D model 150 (e.g., describing both the characteristics of the 3D model 150 and ways in which the 3D model 150 can be altered, such as by articulating various portions of the 3D model 150, changing a light source of 3D model 150, etc.). In the example depicted in FIG. 1, 3D model 150 may be a 3D model of a human figure. It is to be appreciated that the various techniques described herein are not limited to 3D models of humans and any 3D model may be used in accordance with the desired implementation. In various examples, the 3D model may be of an object class that corresponds to an object class for which detector 128 is designed to detect. For example, if detector 128 is designed to detect cars, 3D model(s) 150 may include various 3D models of different types of cars. 3D model(s) 150 may include data describing light sources and data describing ways in which the 3D model may be articulated, sized, shaped, rotated, and/or otherwise transformed.

In various examples, the 3D model feature extractor 120 may be a fully convolutional network (FCN). In at least some examples, the 3D model feature extractor 120 may comprise a graph convolutional neural network (GCN). Graph convolutional neural networks may be configured to receive a mesh representation of the 3D model 150 as a raw data input and may perform a convolution operation over the surface of the 3D model mesh to generate feature vectors representing the 3D model 150 and ways in which the 3D model 150 can be transformed. Graph convolutional neural networks may differ from conventional convolutional neural networks in that conventional convolutional neural networks use a kernel to perform a convolution operations over a 2D grid (e.g., a grid of pixels). Conversely, graph convolutional neural networks perform convolutions over a surface by taking a general version of connected inputs and determining nodes connected to the inputs based on neighborhood constraints.

In some other examples, if a parametric representation of the 3D model 150 is provided as raw input data, the 3D model feature extractor 120 may comprise an encoder trained as part of an encoder/decoder network. The encoder may take the parametric representation of the 3D model 150 as input and may generate feature vectors representing the 3D model 150 and ways in which the 3D model 150 can be transformed, as described above. The decoder may take the feature vectors representing the 3D model 150 as input and may generate a parametric representation of the 3D model 150. The cost/loss may be determined by comparing the parametric representation output by the decoder to the "raw input" parametric representation. Back propagation may be used to train the encoder/decoder network based on the cost/loss. After training the encoder/decoder network, the encoder may be used to generate feature vectors representing the 3D model 150 from the parametric representation of the 3D model 150.

FCN 121 may be a convolutional neural network (CNN) in which the last fully connected layer is substituted by another convolution layer with a large receptive field to localize activations. FCN 121 may generate a feature vector describing one or more components represented in the background image data 152. Generating a feature vector from the input image data may reduce the dimensionality of subsequent processing. In various examples, FCN 121 may receive background image data 152 (e.g., a frame of background image data) and may extract feature vectors describing the background image data 152. FCN 120b may be trained to extract feature vectors of background image data prior to use of synthetic composite image data training network 118 to generate synthetic composite image data, as described in further detail below.

In various examples, the background image data 152 may also be a 3D model. In such cases, FCN 121 may be a neural network trained to extract feature vectors representing a 3D model (such as the GCN and/or the encoder described above with respect to 3D model feature extractor 120).

Examples of FCN 121 (where background image data 152 comprises 2D image data) may include Alexnet, Resnet, VGG16, etc. A feature vector describing background image data 152 (extracted by FCN 121) and a feature vector describing input 3D model 150 (extracted by 3D model feature extractor 120) may be combined to generate a composite feature vector. The combined composite feature vector may reduce the dimensionality of further processing. For example, a frame of background image data may be 300×300 pixels. FCN 121 may generate a 128×1 feature vector representing the background frame. Similarly, 3D model feature extractor 120 may generate a 128×1 feature vector (or some other number of dimensions) representing the 3D model 150. Accordingly, in the foregoing examples, the combination of the feature vectors may generate a 256×1 composite feature vector. Feature vectors may be combined by feature combiner component 122 which may be implemented as hardware (e.g., as an application specific integrated circuit, field programmable gate array, or the like), in software, or in some combination thereof. In various examples, feature combiner component 122 may use concatenation, matrix multiplication, and/or other known techniques to combine feature vectors representing 3D Model(s) 150 and/or background image data 152. As previously described, the level at which feature vectors are extracted in the various deep learning networks used to perform feature extraction (e.g., 3D Model feature extractor 120, FCN 121, etc.) may be learned and/or optimized for a particular implementation. In some further examples, different architectures apart from those explicitly described herein may be used to extract feature data. For example, the output of two separately trained FCNs may be fed into a different FCN to extract feature vectors from 3D models. Various other implementations of feature extraction components are possible and will be apparent to those skilled in the art.

The combined feature vector may be sent to theta learner 124. Theta learner 124 may be, for example, a CNN that may be initialized (e.g., randomly) and trained to determine one or more operations to perform on the 3D model 150 to generate synthetic composite image data. Examples of operations may include articulation of one or more components of the 3D model 150, resizing, reshaping, altering the light source, changing colors, textures, etc. In addition, various operations may include determining a placement of the 3D model within the background image data 152. As described in further detail below, theta learner 124 may learn to composite the foreground image data with the background image data 152 in a way that appears natural to a natural image classifier (discussed in FIG. 6). Other example operations that may be performed by the theta learner on the 3D model 150 may include rotation (e.g., rotation of the foreground image data when compositing the foreground image data with the background image data), scaling (e.g., changing the size of the foreground image data relative to the background image data), shearing (e.g., changing the size of the foreground image data in one dimension by a first amount and in a second dimension by a second amount different from the first amount), color scaling (changing brightness and/or intensity of color values of pixels of the foreground image data to make the foreground image look lighter or darker), etc. For example, chrominance and/or luminance values of pixels of the 3D model 150 may be adjusted in order to match chrominance and/or luminance values of proximate pixels in the background image data 152. Additionally, illumination artifacts may be added to the synthetic composite image data either in the foreground region, the background region, or both. An example of an illumination artifact may be changing illumination values of pixels according to a new light source described by the 3D model 150, such as a lamp or other light source. The illumination values may be changed non-uniformly to simulate the light source on both the foreground and background image data.

As discussed in further detail below, parameters of theta learner 124 (e.g., weights and/or biases) may be updated during processing using back propagation to improve the performance of theta learner 124. The training objective of theta learner 124 may be to maximize misclassification loss 132 of detector 128. Stated another way, the training objective of theta learner 124 is to minimize the confidence score of object-of-interest detections made by detector 128 and thereby to generate "hard positive" synthetic composite image data. Hard positive synthetic composite image data is image data that includes 3D model 150 (as transformed by theta learner 124) composited with background image data 152 in which detector 128 is unable to detect any objects-of-interest—despite the presence of objects-of-interest represented within the synthetic composite image data. Misclassification loss may be loss related to object detection by detector 128. A training objective of theta learner 124 may be to increase misclassification loss of detector 128. Accordingly, parameters of theta learner 124 may be updated to increase the misclassification loss of detector 128.

In various other examples, hard negative training data may be generated. An example of hard negative training data may be where detector 128 determines that an object-of-interest is present when, in fact, no object-of-interest is represented in the image data. For example, detector 128 may be trained to detect humans. In the example, a 3D model of a cat may be used to composite a two-dimensional representation of the cat with background image data. If the detector 128 classifies the cat as a human, the composite image data may be referred to as a hard negative. In the example, detector 128 may also be trained using hard negative data to minimize error for the human class of objects. Accordingly, detector 128 may be trained to maximize human class confidence scores. Generally, as described herein, hard training data and/or hard training images may refer to either hard positive or hard negative synthetic composite image data.

After determining the operations to be used to transform 3D model 150, a differentiable renderer component 125 (e.g., a neural mesh renderer (NMR)) may be used to determine a 2D representation of the 3D model, as transformed according to the operations determined by the theta learner 124. As described in further detail below, the DR component 125 may be part of the overall neural network architecture such that back propagation may be used to update parameters of the DR component 125. Various DR components may be used such as RenderNet, for example, to generate 2D representations of the 3D model 150, as transformed by theta learner 124.

After generating the foreground image data (e.g., the 2D representation of the 3D model as transformed by the theta learner 124) spatial transformation layer 126 may generate the synthetic composite image data by rendering the foreground image data with the background image data 152 to generate synthetic composite image data. In various examples, the spatial transformation layer 126 may composite the foreground image data output by DR component 125 (e.g., by rotating, shearing, translating, color scaling, blending, etc., the 2D foreground image data output by DR component 125) and by replacing a subset of the pixel values of background image data 152 with pixel values of the foreground image data, as transformed by the operations determined by theta learner 124. In various examples, to generate the synthetic composite image data, the spatial transformation layer 126 may evaluate pixels of the background image data 152 on a pixel-by-pixel basis to determine whether or not the pixel values at each pixel address should be replaced by a pixel value of the foreground image data. In various examples, the spatial transformation layer 126 may determine a plurality of pixel addresses in the background image data 152 at which to render the 2D representation of the transformed 3D model 150 (e.g., the transformed representation of the foreground object-of-interest). Thereafter, the spatial transformation layer 126 may composite the 2D representation of the 3D model 150 with the background image data 152 on a pixel-by-pixel basis at the determined plurality of pixel addresses.

In various examples, the spatial transformation layer 126 may be a shallow FCN that is pre-trained prior to run time of synthetic composite image data training network 118. Spatial transformation layer 126 may receive signals from theta learner 124 and/or DR component 125 describing the operations to be performed to transform the 2D representation of the 3D model 150 as well as parameters related to the transformation. For example, spatial transformation layer 126 may receive a signal indicating that the foreground image data should be rotated. Additionally, the spatial transformation layer 126 may receive the parameters "Counterclockwise" and "45°" related to the rotation operation. Spatial transformation layer 126 may compose the foreground image data, as transformed according to the operations and parameters received from theta learner 124, at the appropriate location in the frame of background image data 152 to generate synthetic composite image data (e.g., a frame of synthetic composite image data). In various examples, after performing one or more transformation operations determined by theta learner 124 such as rotating, translating, color scaling, etc., the spatial transformation layer 126 may use blending techniques to make the foreground image appear more natural when composited into the background image. Various blending techniques such as Gaussian blurring, alpha blending, Image Inpainting, Poisson Matting, etc., are known and may be used to blend the transformed foreground image with the background image.

The synthetic composite image data generated by spatial transformation layer 126 may be sent to detector 128. Detector 128 may be a single shot detector (SSD) or other detector effective to locate and/or classify objects-of-interest in image data. For example, detector 128 may be an object detector that has been trained to detect dogs. Detector 128 may generate a bounding box that identifies the location of a dog detected in the input image data (e.g., in the synthetic composite image data generated by synthetic composite image data training network 118). Misclassification loss 132 may occur when detector 128 misidentifies a dog. Stated another way, misclassification loss 132 may occur when detector 128 identifies a dog in image data where no dog is present and/or when detector 128 identifies a non-dog object as a dog. In various examples, for each bounding box generated by detector 128, detector 128 may generate a confidence score indicating a confidence that detector 128 has correctly identified a dog bounded by the bounding box.

In various examples, computing device(s) 102 may be effective to implement synthetic composite image data training network 118. In various examples, computing device(s) 102 may be configured in communication such as over a network 104. Network 104 may be a wide area network, such as the internet, a local area network, and/or some combination thereof. Additionally, in various examples, computing device(s) 102 may be configured in communication with a non-transitory, computer-readable memory 103. Non-transitory, computer-readable memory 103 may be effective to store one or more instructions that, when executed by at least one processor of computing device(s) 102 program the at least one processor to perform the various techniques described herein.

Additionally, in some examples, different components of system 100 of FIG. 1 may be implemented by different computing devices. For example, the theta learner 124 may be implemented by a first computing device and 3D model feature extractor 120 may be implemented by a second computing device.

In various examples, confidence scores of object detections performed by detector 128 may be back propagated to theta learner 124. Theta learner 124 may minimize the confidence scores generated by detector 128 by updating weights and/or biases of the theta learner 124. Accordingly, over time, theta learner 124 is able to select operations to transform 3D model 150 that result in increased misclassification loss 132 from detector 128. Additionally, in some further examples, back propagation from detector 128 may be back propagated to DR component 125. DR component 125 may minimize the confidence scores generated by detector 128 by updating weights and/or biases of the DR component 125. Accordingly, over time, DR component 125 is able to determine two-dimensional representations of 3D model 150 (as transformed by theta learner 124) that result in increased misclassification loss 132 from detector 128.

As theta learner 124 is increasingly able to generate synthetic composite image data that is difficult for detector 128 to detect over time, synthetic composite image data training network 118 begins to generate more and more hard training images 162. Hard training images 162 are synthetic composite image data in which detector 128 is unable, in its current run-time state, to detect relevant objects-of-interest. In various examples, the ratio of updates of the theta learner 124 relative to the detector may be greater than 1. For example, weights and/or biases of theta learner 124 may be updated upon every iteration of synthetic composite image data training network 118, while weights and/or biases of detector 128 may be updated every four iterations (or some other suitable number of iterations) of synthetic composite image data training network 118. In the dog detection example above, the theta learner 124 may generate a synthetic composite image by rotating 3D model 150 depicting a dog by 45 degrees clockwise and by extending one of the legs of the dog in the articulable 3D model 150. After generating a two-dimensional representation of the transformed dog and compositing the 2D representation with back ground image data, the detector 128 may be unable to detect any numbers in the synthetic composite image. Thus the synthetic composite image (as generated by spatial transformation layer 126) may be stored in a repository of hard training data 160 along with the annotations 154. The annotations 154 may represent a location and/or classification of the object-of-interest. Since the operations performed by theta learner 124 and/or DR component 125 are known for the hard training image 162, the annotation 154 for the hard training image 162 is known and may be stored in association with the hard training image 162.

In various examples, synthetic composite image data training network 118 may be used to generate a particular number of frames of hard training images 162. For example, a target number and/or threshold number of frames of hard training images 162 may be determined. As previously described, hard training images 162 may be synthetic composite image data generated using system 100. After the target and/or threshold number of frames is reached, the hard training images 162 may be mixed with other training data (e.g., training data used to train the detector 128) to generate an updated training dataset. Detector 128 may be trained using the mixture of hard training images 162 and regular training data of the updated training dataset. Training the detector 128 with hard training images 162 along with regular training data may improve the performance of detector 128, as the hard training images 162 represent images that the detector 128, in its previous run-time state, was unable to accurately perform object detection. Accordingly, the hard negative or hard positive training data (e.g., the hard training images or hard training data) may allow the detector 128 to reduce the number of detection "blind spots" in which the detector 128 is unable to accurately detect objects-of-interest in image data.

Additionally, after training the detector using the mix of hard training images 162 and regular training data, the synthetic composite image data training network 118 may again be used to generate additional hard training images 162 for the updated detector 128. After the appropriate number of hard training images 162 are again generated, the detector 128 may be again retrained to further improve the performance of the detector 128. Accordingly, the synthetic composite image data training network 118 may be iteratively used until the performance of detector 128 is optimized. In various examples, the detector 128 may be retrained after a particular number of updates to theta learner 124 (e.g., after a threshold number of updates, such as 2, 3, 4, 5, or any other suitable number of updates). In some other examples, the detector 128 may be retrained after a particular number of hard training images 162 are generated and stored in repository of hard training data 160. In some further examples, detector 128 may be retrained whenever the theta learner 124 has been updated a threshold number of times or when a threshold number of hard training images 162 are generated—whichever occurs first.

Figure 2:
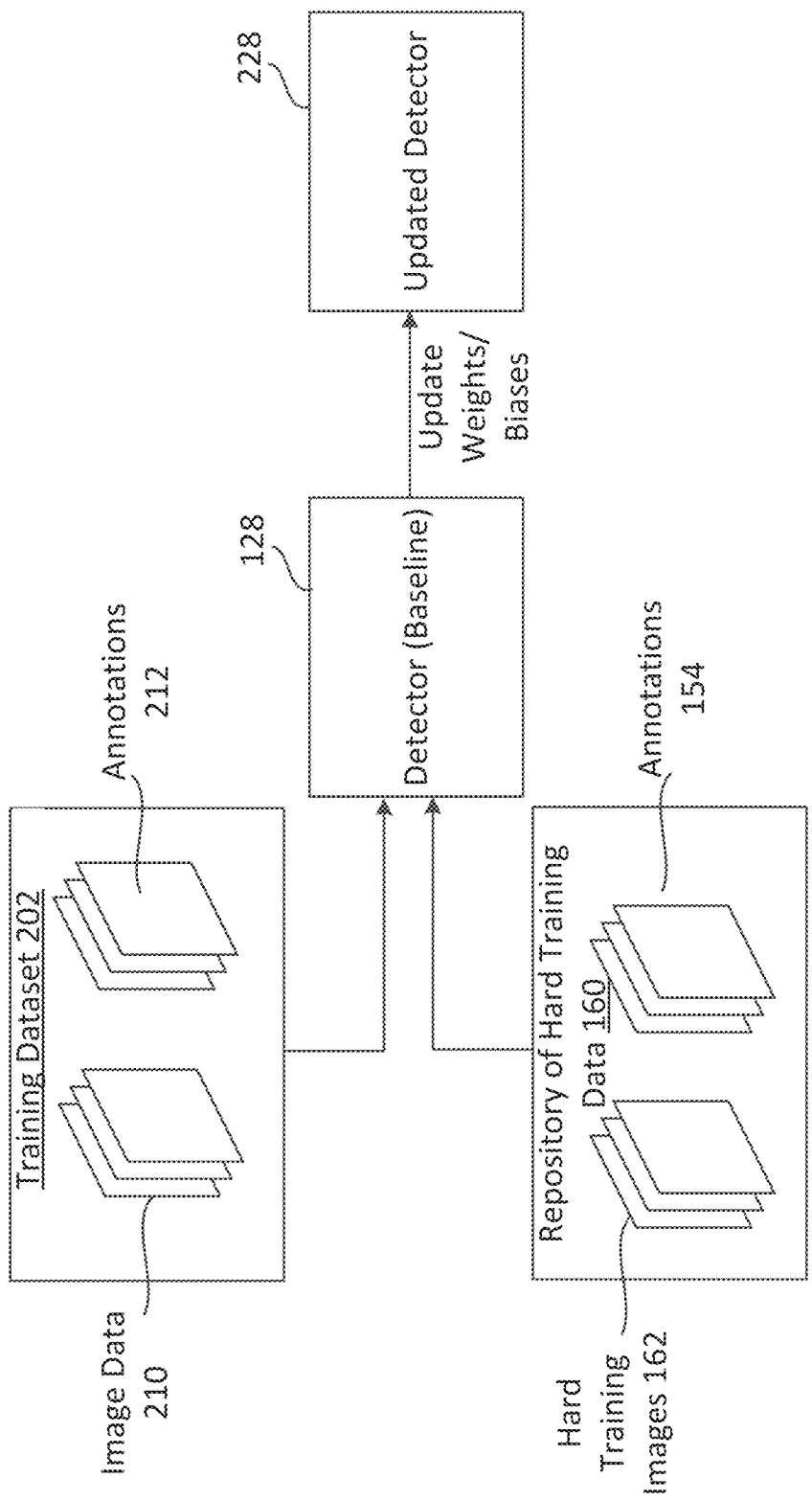
FIG. 2 is a block diagram depicting a training stage effective to train an object detector using hard training images, in accordance with various aspects of the present disclosure.

FIG. 2 is a block diagram depicting a training stage effective to train an object detector using hard training images, in accordance with various aspects of the present disclosure.

In various examples, synthetic composite image data training network 118 may be used to generate a particular number of hard training images 162. For example, a target number and/or threshold number of composite hard training images 162 may be determined. After the target and/or threshold number is reached, the hard training images 162 may be mixed with training data of training dataset 202 (e.g., a default training dataset for detector 128). Hard training images 162 may be frames of background image data 152 where pixel values of particular pixels of the background image have been replaced by pixel values of the segmented foreground image of the 3D model 150, as transformed by theta learner 124, DR component 125, and/or spatial transformation layer 126. Training dataset 202 may comprise one or more frames of image data 210. Each frame of image data 210 may be associated with one or more annotations 212. The annotations may provide a label including a classification of at least one object-of-interest within the frame (e.g., "human", "dog", etc.), and a location of the object-of-interest within the frame (e.g., a pixel address of the lower left-hand corner of a bounding box defining a number of contiguous pixels including the object-of-interest). Detector 128 may be trained using the mixture of hard training images 162 and training dataset 202 to update the weights and/or biases of detector 128 and generate updated detector 228. Training the detector 128 with hard training images 162 along with training dataset 202 may improve the performance of updated detector 228 relative to detector 128, as the hard training images 162 represent images in which the detector 128 was unable to accurately perform object detection. Accordingly, the hard training data may allow the detector 128 to reduce the number of detection "blind spots" in which the detector 128 is unable to accurately detect objects-of-interest in image data.

Figure 3:
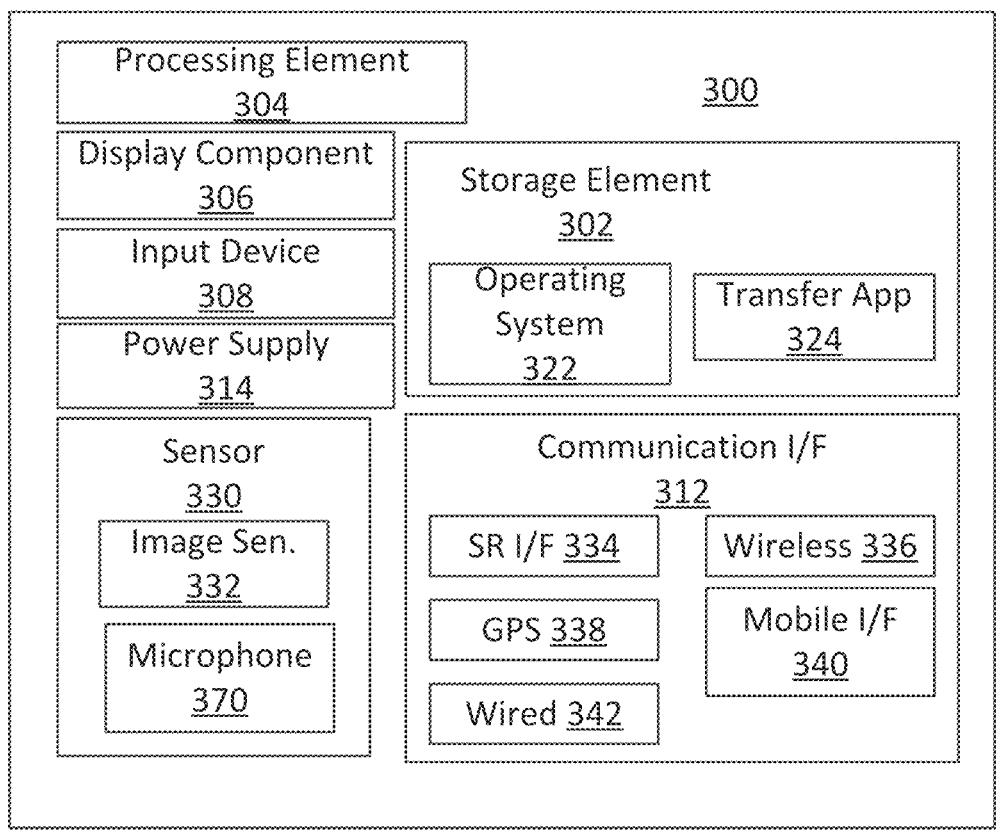
FIG. 3 depicts an example architecture of a computing device that may be used, in accordance with various aspects of the present disclosure.

FIG. 3 is a block diagram showing an example architecture 300 of a computing device, such as the processors and other computing devices described herein. It will be appreciated that not all user devices will include all of the components of the architecture 300 and some user devices may include additional components not shown in the architecture 300. The architecture 300 may include one or more processing elements 304 for executing instructions and retrieving data stored in a non-transitory computer-readable storage element 302. The processing element 304 may comprise at least one processor. Any suitable processor or processors may be used. For example, the processing element 304 may comprise one or more digital signal processors (DSPs) and/or image signal processors (ISPs). In some examples, the processing element 304 may be effective to perform one or more functions of detector 128, synthetic composite image data training network 118, FCNs 120a, 120b, theta learner 124, spatial transformation layer 126, natural image classifier 602, etc. The storage element 302 can include one or more different types of non-transitory, computer-readable memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to receive images and/or video from another device (e.g., a mobile device, image capture device, and/or display device) or from an image sensor 332 included in the architecture 300. In some examples, the transfer application 324 may also be configured to upload the received images to another device that may perform processing as described herein (e.g., a mobile device and/or another computing device).

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices. For example, the communication interface 312 may comprise a wireless communication module 336 configured to communicate on a network, such as the network 104, according to any suitable wireless protocol, such as IEEE 702.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output.

Motion sensors may include any sensors that sense motion of the architecture including, for example, gyro sensors and accelerometers. Motion sensors, in some examples, may be used to determine an orientation, such as a pitch angle and/or a roll angle, of a camera. A gyro sensor may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. In some examples, an accelerometer (not shown in FIG. 3) may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338. As described, in some examples, image sensor 332 may be effective to detect infrared light. In at least some examples, architecture 300 may include an infrared light source to illuminate the surrounding environment.

Figure 4:
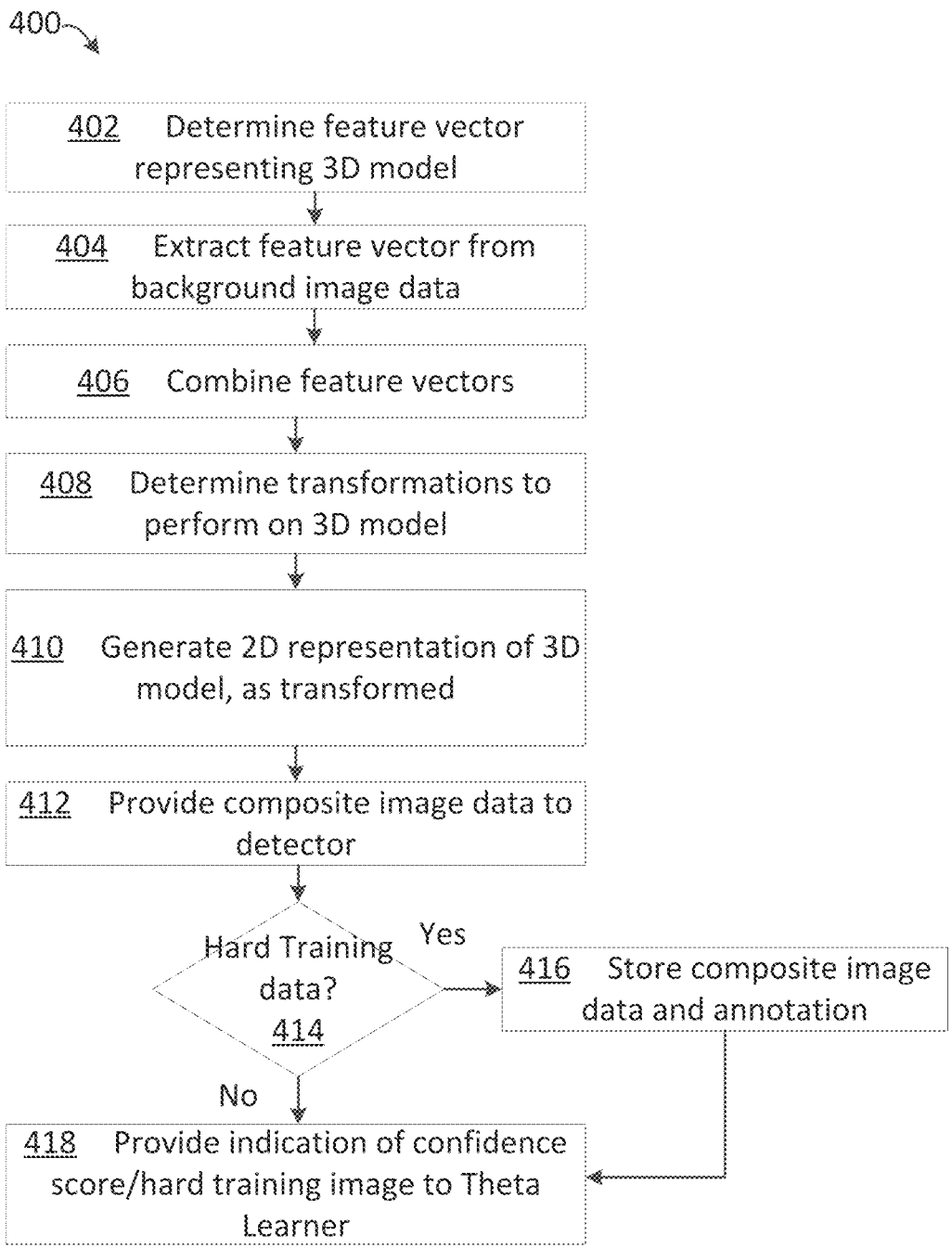
FIG. 4 depicts a process for generating synthetic image data using three-dimensional models for training an object detector, in accordance with various aspects of the present disclosure.

FIG. 4 depicts a process 400 for generating synthetic image data for training an object detector, in accordance with various aspects of the present disclosure. The process 400 of FIG. 4 may be executed by computing device(s) 102. The actions of process 400 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 400 may be described above with reference to elements of FIGS. 1-3.

Processing may begin at action 402, "Determine feature vector representing 3D model". At action 402, a feature vector representing an input 3D model may be generated by a machine learning layer, 3D model feature extractor 120. As previously described, the feature vector may be generated in various different ways depending on the type of input data used to represent the 3D model. For example, if a mesh representation of the 3D model is input, a GCN may be used to determine the feature vector. If a parametric representation of the 3D model is input, an encoder trained as part of an encoder/decoder pair may be used to generate the feature vector. The feature vector may be a numeric representation of the input 3D model data. In various examples, the feature vector may be of a reduced dimensionality relative to the input 3D model data and may therefore reduce the complexity of further compute operations.

Processing may continue from action 402 to action 404, "Extract feature vector from background image data". At action 404, a feature vector representing input background image data may be extracted by a machine learning layer, such as FCN 121. The feature vector may be a numeric representation of the input background image data. In various examples, the feature vector may be of a reduced dimensionality relative to the input background image data and may therefore reduce the complexity of further compute operations. As previously described, in various examples, the background image data may also be a 3D model. In such examples, a feature vector representing the 3D background model may be generated using the various techniques described above (e.g., GCNs and/or encoder/decoder networks).

Processing may continue from action 404 to action 406, "Combine feature vectors". At action 406, the foreground and background feature vectors may be combined (e.g., through concatenation, matrix multiplication, etc.) to generate a combined feature vector representing both the foreground image data and the background image data.

Processing may continue from action 406 to action 408, "Determine transformations to perform on 3D model". At action 408, a machine learning layer and/or model (e.g., theta learner 124) may determine one or more transformations to perform on the foreground image for compositing the foreground image with the background image. In various examples, the machine learning model may be trained to determine one or more spatial, color, intensity operations, articulations of movable and/or articulable portions of the input 3D model, operations used to change a position, intensity, and/or wavelength of one or more light sources, etc.

Processing may continue from action 408 to action 410, "Generate 2D representation of 3D model, as transformed." At action 410, DR component 125 and/or another component may generate a two-dimensional representation of the 3D model as transformed according to the operations determined at action 408. In various examples, the DR component 125 may be a neural network trained to generate a 2D representation of 3D image data based on a featurized representation of the 3D image data (e.g., a feature vector and/or map representing the 3D model).

In various examples, after generating the 2D representation, spatial transformation layer 126 may composite the transformed 2D representation (e.g., the foreground image data) on a pixel-by-pixel basis to replace pixels of the background image at a particular location determined by the theta learner 124 and spatial transformation layer 126 to generate a frame of synthetic composite image data. The synthetic composite image data may comprise the transformed foreground image (e.g., the transformed 2D representation of the input 3D model) combined with or "composited with" the background image data. The various operations determined by theta learner 124 and applied by spatial transformation layer 126 may be used to "paste" the foreground image data into the background image data in such a way that the detector 128 may have difficulty identifying objects-of-interest represented by the foreground image data. Theta learner 124 may be trained to minimize the confidence score of detections of objects-of-interest by detector 128.

Processing may continue from action 410 to action 412, "Provide composite image data to detector". At action 412, the synthetic composite image data generated by spatial transformation layer 126 may be provided to detector 128. In various other examples, the synthetic composite image data may be provided to a natural image classifier (e.g., a discriminator model) trained to make a determination as to whether input image data is natural image data or synthetic image data (e.g., the synthetic composite image data generated by spatial transformation layer 126). In various examples, a signal representing the output label (e.g., "natural" or "synthetic") from the natural language classifier may be back propagated to theta learner 124. The signal may be, for example, feedback data from the natural image classifier. Theta learner 124 may be trained using the back-propagated signal to determine operations used to transform foreground image data in a way that maximizes the likelihood that the natural language classifier determines that the synthetic composite image data is natural (e.g., non-synthetic). The synthetic composite image data may be provided to detector 128.

At action 414, a determination may be made whether the synthetic composite image data provided to detector 128 is a hard training image (e.g., a hard positive or hard negative). Hard positive training data may be image data for which detector 128 is unable to detect the presence of any objects-of-interest in the image data, despite the presence of objects-of-interest represented in the image data.

If, at action 414, a determination is made that the synthetic composite image data is a hard training image, processing may continue to action 416, "Store composite image data and annotation". At action 416, the hard training image (e.g., the synthetic composite image data for which detector 128 was unable to detect any objects-of-interest) may be stored in a non-transitory computer-readable memory. Additionally, since the spatial transformation layer 126 combines the foreground image data including the object(s)-of-interest, the annotation for the hard training image is known by system 100. Accordingly, the annotation for the synthetic composite image data is known and may be stored in the memory (e.g., repository of hard training data 160, FIG. 2) in association with the relevant hard training image.

If, at action 414, one or more objects-of-interest are detected in the synthetic composite image data, (e.g., the synthetic composite image data is not a hard positive), processing may proceed from action 414 to action 418, "Provide indication of confidence score/hard training image to theta learner". The confidence score for the detection of the object-of-interest may be provided to the theta learner. Weights/biases of the theta learner 124 may be updated to minimize the confidence score of the detector 128. If a hard training image is determined at action 414, an indication (e.g., a back propagation signal) that the synthetic composite image data was determined by detector 128 to be a hard training image may be provided to theta learner 124. Accordingly, the theta learner may be trained to generate operations to perform on the foreground image data that minimize the confidence score of detection of objects-of-interest by detector 128. In various examples, the DR component 125 may also be retrained using back propagation to minimize the confidence score of the detector 128.

Figure 5:
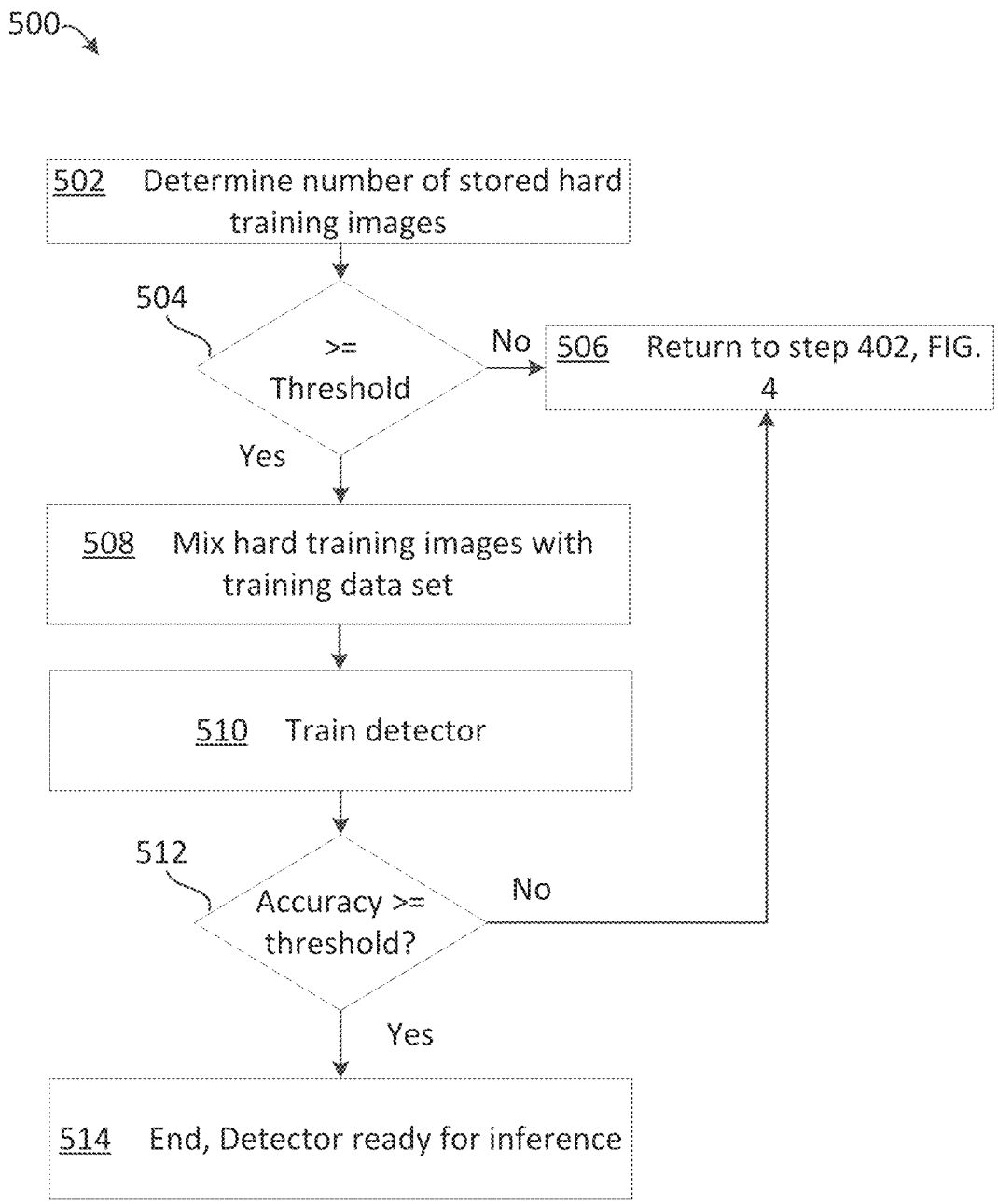
FIG. 5 depicts a process for training an object detector using synthetic image data, in accordance with various aspects of the present disclosure.

FIG. 5 depicts a process 500 for training an object detector using synthetic image data, in accordance with various aspects of the present disclosure. The process 500 of FIG. 5 may be executed by computing device(s) 102. The actions of process 500 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 500 may be described above with reference to elements of FIGS. 1-4.

Process 500 may begin at action 502, "Determine number of stored hard training images." At action 502, the number of frames of hard training images stored in repository of hard training data 160 may be determined. At action 504, a determination may be made whether the number of hard training images stored in repository of hard training data 160 is at, or exceeds, a threshold number of stored composite hard training images. In various other examples, a determination may be made whether a threshold number of synthetic composite image data with confidence scores below a predetermined level (e.g., less than 40%, less than 35%, or any other suitable confidence score) have been generated and stored in memory.

If, at action 504, a determination is made that the number of frames of hard training images (e.g., frames of synthetic composite image data that represent hard negatives or hard positives for the detector 128) does not meet or exceed the threshold or target number, processing may proceed to action 506 at which the process may return to action 402 of FIG. 4 and additional synthetic composite image data may be generated. Alternatively, if, at action 504, a determination is made that the number of hard training images meets or exceeds the threshold number of hard training images, processing may continue from action 504 to action 508, "Mix hard training images with training data set". In various examples, the hard training images stored in repository of hard training data 160 may be mixed with a training data set. The training data set may comprise annotated training data used to train detector 128. Any desired training data set may be used. For example, the training data set may be a training data set previously used to train detector 128 prior to initiating process 400 of FIG. 4. Various algorithms to mix synthetic composite image data with other training data are known and may be used. In at least some examples, an approximately equal number (e.g., to within a tolerance of +/−10%) of hard training image data and non-synthetic training data may be mixed (e.g., randomized or pseudo-randomized) to create a new set of training data. The ratio of hard training image data to regular training data (e.g., non-synthetic annotated image data) may be a tunable parameter and may be modified to improve the performance of the detector 128.

Processing may continue from action 508 to action 510, "Train detector". At action 510 the detector 128 may be trained using the newly generated set of training data comprising the mixture of hard training image data and non-synthetic image data. The performance of the detector may be improved as using annotated hard training image data to train the detector may reduce the number of "blind spots" of the detector, as the detector may learn how to detect objects-of-interest in the hard training images from the annotations. Although object detectors are generally described herein, the techniques described herein may be used to train segmentation algorithms and/or other CNN models.

Processing may continue from action 510 to action 512, at which a determination may be made whether the accuracy of detector 128 is greater than or equal to a threshold. For example, a set of test data (e.g., image data including objects-of-interest) may be used to test the detector 128 trained at action 510. If the accuracy of object detection exceeds a threshold level, processing may conclude at action 514 and the detector 128 may be ready for inference (e.g., runtime prediction). However, if the accuracy is less than the accuracy threshold, processing may return to action 402 of FIG. 4 and additional hard training images may be generated, mixed with other training data, and used to improve the performance of detector 128, in accordance with various techniques discussed herein. Alternatively, as described herein, the detector 128 may be retrained based at least in part on the number of times that theta learner 124 has been updated since the last training of detector 128.

Figure 6:
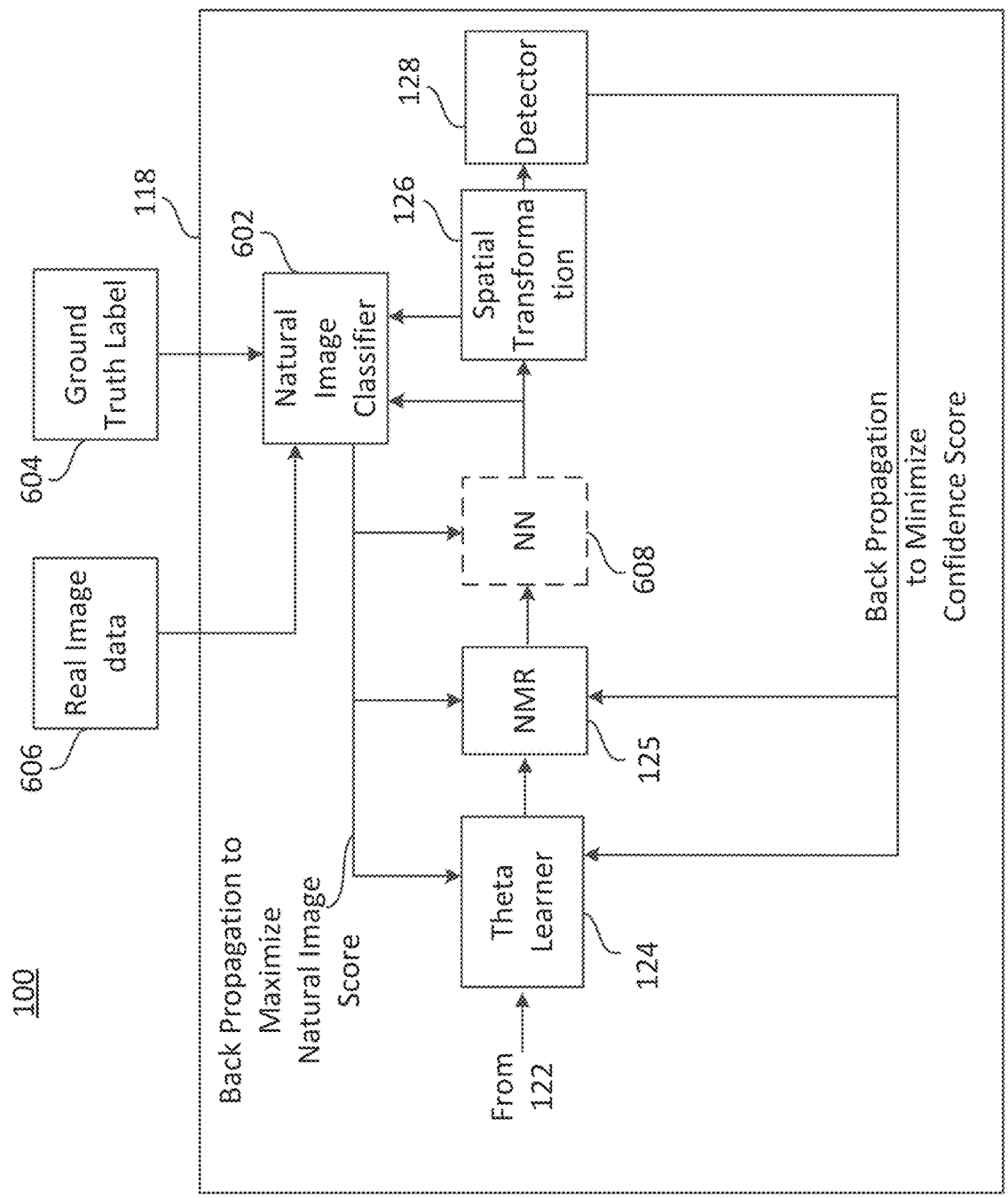
FIG. 6 is a block diagram showing an example system effective to generate synthetic image data from three-dimensional models, the example system including a natural image classifier, in accordance with various aspects of the present disclosure.

FIG. 6 is a block diagram showing an example system effective to generate synthetic image data including a natural image classifier 602, in accordance with various aspects of the present disclosure. System 100 may comprise a natural image classifier 602.

Natural image classifier 602 may be a discriminator pre-trained to generate natural image scores (e.g., binary decision data) indicating whether or not input image data is synthetic or non-synthetic (e.g., real). As previously described, synthetic image data may be synthetic composite image data generated, for example, using the processes described above in reference to FIGS. 1-6. In various examples, non-synthetic image data may comprise natural or "real" image data, such as image data captured by a camera. In various examples, a natural image score of "1" for an input image may indicate that the image is non-synthetic or "real" while a natural image score of "0" for an input image may indicate that the image is synthetic or "fake". Real image data 606 may be provided to natural image classifier 602 along with the synthetic composite image data generated by synthetic composite image data training network 118.

Synthetic foreground image data may be provided to the natural image classifier at various different stages. For example, synthetic image data generated by DR component 125 may be provided to natural image classifier 602 for classification. As previously described, DR component 125 may generate foreground image data comprising a two-dimensional representation of 3D model 150, as transformed according to operations determined by theta learner 124. Accordingly, natural image classifier 602 may determine whether or not the foreground image data generated by DR component 125 is real or fake. In various examples, synthetic composite image data comprising the 2D representation generated by the DR component 125 as composited with the background image data 152 may be provided to natural image classifier 602 by spatial transformation layer 126. Natural image classifier 602 may determine whether or not the synthetic composite image data provided by spatial transformation layer 126 is real or fake. In some further examples, an optional neural network 608 may be coupled to the output of the DR component 125. The optional neural network 608 may determine operations to perform on pixels of the foreground image data generated by DR component 125 in order to make the foreground image data appear more realistic and less synthetic. The output of neural network 608 may be provided to natural image classifier 602 for classification as real or fake.

The output (e.g., the binary decision data described above) of natural image classifier 602 may be back propagated to theta learner 124, DR component 125, and/or optional neural network 608. Theta learner 124, DR component 125, and/or neural network 608 may be trained using the back-propagated signal with the training goal of maximize the natural image score of natural image classifier 602. Accordingly, weights and/or biases of theta learner 124, DR component 125, and/or neural network 608 may be updated to maximize the natural image score of the natural image classifier 602. It should be appreciated that in other examples, "0" may represent a real image while "1" may represent a fake image data. In such examples, the theta learner 124, DR component 125, and/or neural network 608 may be trained to minimize the natural image score. Various other implementations are possible. In general, the natural image classifier 602 may be used to increase the likelihood that synthetic composite image data and/or 2D representations of 3D model 150 (as transformed by theta learner 124) generated by system 100 closely resembles natural image data, such as image data captured by a camera. Additionally, ground truth label 604 may be provided and used to train natural image classifier 602. The ground truth label 604 may be data indicating whether an image evaluated by natural image classifier 602 was non-synthetic or synthetic. In other words, ground truth label 604 may indicate that real image data 606 is real and may indicate that synthetic composite image data and/or synthetic foreground image data generated by synthetic composite image data training network 118 is fake. In various examples, ground truth label 604 may indicate a class of an object (e.g., "cat," "dog," "person," etc.) represented in real image data 606. Parameters of natural image classifier 602 may be updated based on ground truth label 604 to maximize the accuracy of natural image classifier 602.

In various examples, the ratio of updates for natural image classifier 602 relative to detector 128 may be greater than 1, while the ratio of updates for natural image classifier 602 relative to theta learner 124 may be less than one. In an example, parameters of theta learner 124 may be updated every iteration of synthetic composite image data training network 118 while parameters of natural image classifier 602 may be updated every four iterations of synthetic composite image data training network 118. In an example, parameters of detector 128 may be updated every 16 iterations of synthetic composite image data training network 118. The update ratios of theta learner 124, natural image classifier 602, and detector 128 may be a tunable parameter that may be adjusted to improve performance of synthetic composite image data training network 118 and detector 128. Generally, updating theta learner 124 more frequently than natural image classifier 602, and updating natural image classifier 602 more frequently than detector 128 may provide a significantly improved accuracy of detector 128 after a suitable number of iterations.

Among other potential benefits, various embodiments of the present disclosure may be effective to generate synthetic composite image data that may be used to improve the performance of a computer vision detector. In particular, the various techniques described herein may be used to automatically generate annotated hard training images by combining foreground image data that includes an object-of-interest (e.g., an object for which the detector has been trained to detect) with a background image. Since the hard training images represent image data that the detector currently is unable to correctly process to detect objects-of-interest, generation of annotated hard training images may be highly useful for re-training the detector so that the detector may thereafter be able to improve its performance during runtime in detecting objects in image data that is similar to the hard training images. Additionally, automatic generation of annotated synthetic composite image data in accordance with the various techniques described herein exponentially increases the amount of training data that may be used to train a computer vision detector without requiring the data to be manually annotated. Additionally, the various back propagation techniques described herein may be used to improve the ability of the system to detect "blind spots" for a particular computer vision detector and to generate training data that is tailored to remedy such "blind spots" of the detector by "teaching" the detector to recognize objects in such image data. Finally, use of 3D models may increase the amount of hard training examples that may be generated (e.g., by posing a 3D model in a variety of different ways and compositing the 3D model in a 2D background). Further, use of 3D models may be advantageous in training detectors that are able to detect actions (e.g., running, jumping, etc.), as a 3D model may be posed in a frame-by-frame manner according to an action of interest.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

Figure 7:
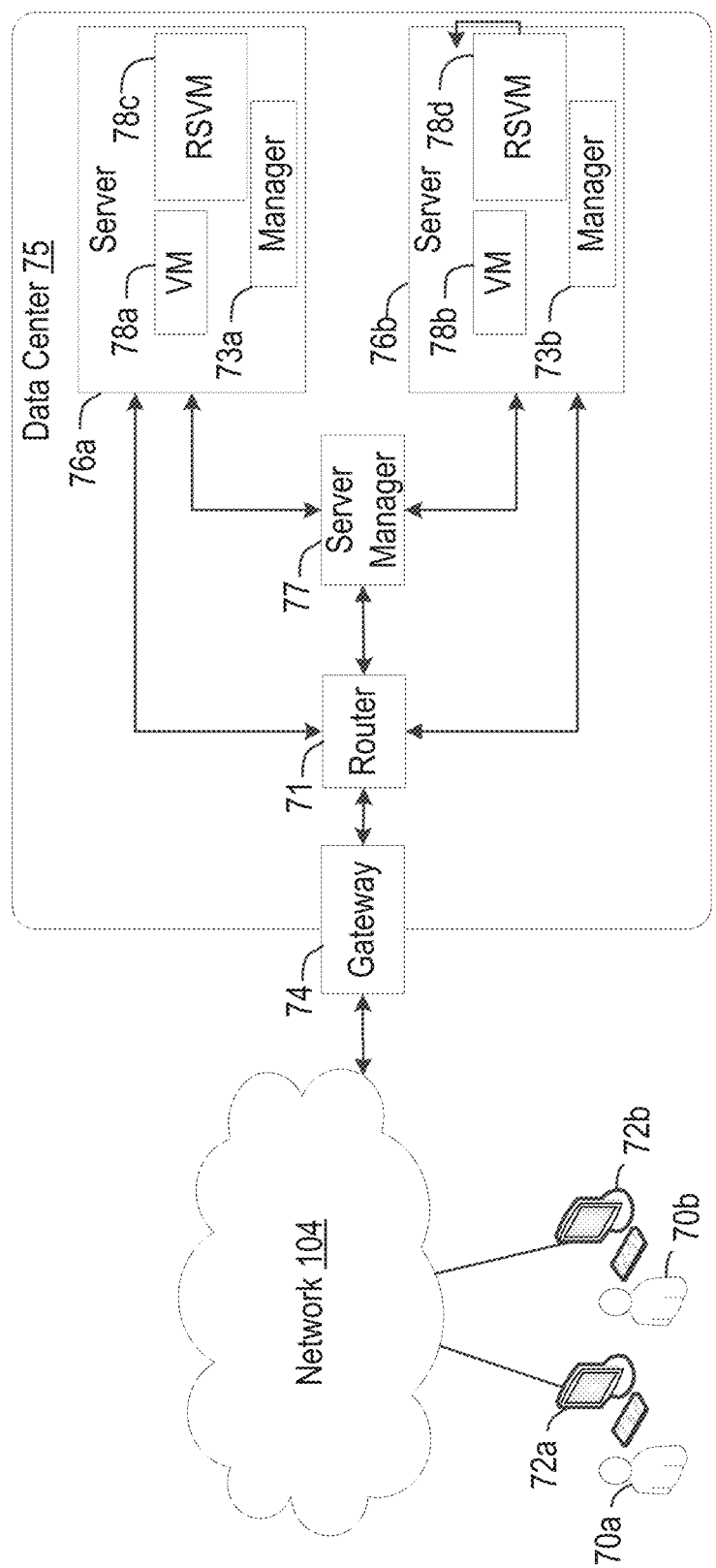
FIG. 7 is a diagram illustrating an example system for sending and providing data that may be used in accordance with the present disclosure.

An example system for sending and providing data and generation of synthetic data for computer vision object detection models will now be described in detail. In particular, FIG. 7 illustrates an example computing environment in which the embodiments described herein may be implemented. FIG. 7 is a diagram schematically illustrating an example of a data center 75 that can provide computing resources to users 70a and 70b (which may be referred herein singularly as user 70 or in the plural as users 70) via user computers 72a and 72b (which may be referred herein singularly as user computer 72 or in the plural as user computers 72) via network 104. Data center 75 may be configured to provide computing resources for executing applications on a permanent or an as-needed basis. The computing resources provided by data center 75 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 75 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). In at least some examples, server manager 77 may control operation of and/or maintain servers 76. Virtual machine instances 78c and 78d are rendition switching virtual machine ("RSVM") instances. The RSVM virtual machine instances 78c and 78d may be configured to perform all, or any portion, of the techniques for improved rendition switching and/or any other of the disclosed techniques in accordance with the present disclosure and described in detail above. As should be appreciated, while the particular example illustrated in FIG. 7 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 72. User computers 72 may be computers utilized by users 70 or other customers of data center 75. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 75. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 75. In this regard, data center 75 might provide a gateway or web interface through which aspects of its operation may be configured through the use of a web browser application program executing on user computer 72. Alternately, a stand-alone application program executing on user computer 72 might access an application programming interface (API) exposed by data center 75 for performing the configuration operations. Other mechanisms for configuring the operation of various web services available at data center 75 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 73a or 73b (which may be referred herein singularly as instance manager 73 or in the plural as instance managers 73) capable of executing the virtual machine instances 78. The instance managers 73 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 75 shown in FIG. 7, a router 71 may be utilized to interconnect the servers 76a and 76b. Router 71 may also be connected to gateway 74, which is connected to network 104. Router 71 may be connected to one or more load balancers, and alone or in combination may manage communications within networks in data center 75, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 75 shown in FIG. 7, a data center 75 is also employed to at least in part direct various communications to, from and/or between servers 76a and 76b. While FIG. 7 depicts router 71 positioned between gateway 74 and data center 75, this is merely an exemplary configuration. In some cases, for example, data center 75 may be positioned between gateway 74 and router 71. Data center 75 may, in some cases, examine portions of incoming communications from user computers 72 to determine one or more appropriate servers 76 to receive and/or process the incoming communications. Data center 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Data center 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 75 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

are intended to be construed without reference to any definitions that may be explicitly or implicitly included in any incorporated-by-reference materials.

What is claimed is:

1. A method comprising:
receiving first image data comprising a three-dimensional model representing an object of a first class;
receiving first background image data comprising a first plurality of pixel values;
generating a first feature vector representing the three-dimensional model;
generating a second feature vector representing the first plurality of pixel values of the first background image data;
generating a transformed representation of the three-dimensional model using the first feature vector;
generating first foreground image data comprising a two-dimensional representation of the transformed representation of the three-dimensional model;
generating a frame of composite image data by combining the first foreground image data with the first background image data; and
sending the frame of composite image data to an object detector trained to detect objects of the first class.

2. The method of claim 1, wherein the transformed representation of the three-dimensional model is generated by a first machine learning model.

3. The method of claim 2, further comprising:
determining, by the object detector, that objects of the first class are not present in the frame of composite image data; and
sending, by the object detector to the first machine learning model, data representing a loss related to object detection.

4. The method of claim 3, further comprising re-training the first machine learning model using the loss related to object detection.

5. The method of claim 1, further comprising:
determining a first position of an articulable portion of the three-dimensional model based at least in part on the first feature vector; and
determining a second position of the articulable portion of the three-dimensional model based at least in part on the first feature vector; and
wherein the generating the transformed representation of the three-dimensional model comprises articulating the articulable portion from the first position to the second position.

6. The method of claim 1, further comprising:
determining, by the object detector, a confidence score that the object represented in the frame of composite image data is of the first class;
sending feedback data indicating the confidence score to a first machine learning model that generated the transformed representation of the three-dimensional model; and
updating a weight of the first machine learning model based at least in part on the feedback data.

7. The method of claim 1, further comprising:
determining, by the object detector, that no objects of the first class are represented in the frame of composite image data;
storing the frame of composite image data in a memory;
determining a number of frames of composite image data stored in the memory;
determining that the number of frames of composite image data stored in the memory is greater than a threshold number of frames, wherein the threshold number of frames represents a target number of frames used to train the object detector; and updating a parameter of the object detector based at least in part on the frames of composite image data stored in the memory.

8. The method of claim 1, further comprising:

determining, based at least in part on the first feature vector and the second feature vector, a first operation to perform on the three-dimensional model, wherein the generating the transformed representation of the three-dimensional model comprises performing the first operation on the three-dimensional model.

9. The method of claim 1, wherein the transformed representation of the three-dimensional model is generated by a first machine learning model, the method further comprising:

sending the frame of composite image data to a natural image classifier;

generating, by the natural image classifier, a first label indicating that the frame of composite image data is synthetic;

generating an updated first machine learning model by updating a second parameter of the first machine learning model based at least in part on the first label;

sending a second frame of composite image data to the natural image classifier, the second frame of composite image data generated based at least in part by the updated first machine learning model; and generating, by the natural image classifier, a second label indicating that the second frame of composite image data is non-synthetic.

10. The method of claim 1, further comprising:

determining a first subset of the first plurality of pixel values of the first background image data based at least in part on the first feature vector and the second feature vector; and replacing the first subset of the first plurality of pixel values of the first background image data with second pixel values representing the first foreground image data.

11. The method of claim 1, further comprising:

determining, by the object detector, a confidence score that the object represented in the frame of composite image data is of the first class;

sending feedback data indicating the confidence score to a first machine learning model that generated the transformed representation of the three-dimensional model;

updating a second parameter of the first machine learning model;

generating a second frame of composite image data by combining second foreground image data with second background image data, wherein the second foreground image data comprises a second two-dimensional representation of another transformed representation of the three-dimensional model;

sending the second frame of composite image data to the object detector; and determining, by the object detector, that no objects of the first class are represented in the second frame of composite image data.

12. The method of claim 1, further comprising:

determining that the object of the first class is not detected by the object detector in the frame of composite image data; and updating a parameter of the object detector based at least in part on the determination that the object of the first class is not detected.

13. A system comprising:

at least one processor; and a non-transitory, computer-readable memory storing instructions that, when executed by the at least one processor, are effective to:

receive first image data comprising a three-dimensional model representing an object of a first class;

receive first background image data comprising a first plurality of pixel values;

generate a first feature vector representing the three-dimensional model;

generate a second feature vector representing the first plurality of pixel values of the first background image data;

generate a transformed representation of the three-dimensional model using the first feature vector;

generate first foreground image data comprising a two-dimensional representation of the transformed representation of the three-dimensional model;

generate a frame of composite image data by combining the first foreground image data with the first background image data; and send the frame of composite image data to an object detector trained to detect objects of the first class.

14. The system of claim 13, wherein the transformed representation of the three-dimensional model is generated by a first machine learning model.

15. The system of claim 14, the non-transitory, computer-readable memory storing further instructions that, when executed by the at least one processor, are further effective to:

determine, by the object detector, that objects of the first class are not present in the frame of composite image data; and send, by the object detector to the first machine learning model, data representing a loss related to object detection.

16. The system of claim 15, the non-transitory, computer-readable memory storing further instructions that, when executed by the at least one processor, are further effective to re-train the first machine learning model using the loss related to object detection.

17. The system of claim 13, the non-transitory, computer-readable memory storing further instructions that, when executed by the at least one processor, are further effective to:

determine a first position of an articulable portion of the three-dimensional model based at least in part on the first feature vector; and determine a second position of the articulable portion of the three-dimensional model based at least in part on the first feature vector, wherein the generation of the transformed representation of the three-dimensional model comprises articulating the articulable portion from the first position to the second position.

18. The system of claim 13, the non-transitory, computer-readable memory storing further instructions that, when executed by the at least one processor, are further effective to:

determine, by the object detector, a confidence score that the object represented in the frame of composite image data is of the first class;

send feedback data indicating the confidence score to a first machine learning model that generated the transformed representation of the three-dimensional model; and update a weight of the first machine learning model based at least in part on the feedback data.

19. The system of claim 13, the non-transitory, computer-readable memory storing further instructions that, when executed by the at least one processor, are further effective to:

determine, by the object detector, that no objects of the first class are represented in the frame of composite image data;

store the frame of composite image data in a memory;

determine a number of frames of composite image data stored in the memory;

determine that the number of frames of composite image data stored in the memory is greater than a threshold number of frames, wherein the threshold number of frames represents a target number of frames used to train the object detector; and update a parameter of the object detector based at least in part on the frames of composite image data stored in the memory.

20. The system of claim 13, wherein the transformed representation of the three-dimensional model is generated by a first machine learning model and wherein the non-transitory, computer-readable memory stores further instructions that, when executed by the at least one processor, are further effective to:

determine, by the first machine learning model based at least in part on the first feature vector and the second feature vector, a first operation to perform on the three-dimensional model, wherein the generating the transformed representation of the three-dimensional model comprises performing the first operation on the three-dimensional model.

* * * * *